(12) United States Patent
Kollé

(10) Patent No.: US 7,677,308 B2
(45) Date of Patent: Mar. 16, 2010

(54) GAS SEPARATOR

(76) Inventor: Jack J. Kollé, 3700 31st Ave. West, Seattle, WA (US) 98199

( * ) Notice: Subject to any disclaimer, the term of this patent is extended or adjusted under 35 U.S.C. 154(b) by 878 days.

(21) Appl. No.: 11/384,455

(22) Filed: Mar. 20, 2006

(65) Prior Publication Data
US 2007/0062374 A1 Mar. 22, 2007

(30) Foreign Application Priority Data
Sep. 20, 2005 (WO) ............... PCT/CA2005/001439

(51) Int. Cl.
*E21B 43/38* (2006.01)
(52) U.S. Cl. .............. 166/265; 166/105.5; 166/311; 166/312; 96/214; 96/217
(58) Field of Classification Search ............ 166/265, 166/105.5, 311, 312; 96/196, 214, 216, 217; 95/270
See application file for complete search history.

(56) References Cited
U.S. PATENT DOCUMENTS

| | | |
|---|---|---|
| 3,304,006 A | 2/1967 | Adams |
| 4,047,580 A | 9/1977 | Yahiro et al. |
| 6,113,675 A | 9/2000 | Branstetter |
| 6,138,757 A | 10/2000 | Latos et al. |
| 2003/0196802 A1 | 10/2003 | Proctor |
| 2005/0109541 A1 | 5/2005 | Marvin et al. |

FOREIGN PATENT DOCUMENTS

| | | |
|---|---|---|
| GB | 733544 | 11/1953 |
| GB | 860073 | 6/1957 |
| GB | 1448167 | 9/1974 |
| WO | WO 9307391 A1 | 4/1993 |

*Primary Examiner*—Giovanna C Wright
(74) *Attorney, Agent, or Firm*—Dunlap Codding, P.C.

(57) ABSTRACT

A combination liquid and gas separator and jetting tool includes a housing containing a rotatable drum, a stator in the inlet end of the housing for swirling a liquid/gas mixture, a rotor attached to the drum for rotation by the mixture; whereby the gas and liquid are separated. The liquid and gas are discharged through separate restricted orifices downstream of the drum. Orifices can be located in a rotating head for cleaning, cutting or other downhole operations.

10 Claims, 5 Drawing Sheets

GAS SEPARATOR

CROSS REFERENCE TO RELATED APPLICATIONS

This application claims benefit of PCT Patent Application No. PCT/CA2005/001439, filed Sep. 20, 2005, which claims benefit of U.S. Provisional Patent Application No. 60/611,111, filed Sep. 20, 2004, the contents of each incorporated herein by reference in their entirety.

BACKGROUND OF THE INVENTION

1. Field of the Invention

This invention relates to a gas separator and in particular to a gas separator for use as an inline, downhole tool for oil and gas well drilling and servicing.

2. Brief Description of the Prior Art

As described in the Latos et al U.S. Pat. No. 6,138,757, there are occasions in the oil and gas industry when a gas is pumped down a well with a liquid. Coiled tubing deployed jetting services are commonly performed in depleted wells using energized fluids—typically nitrogen and water. Underbalanced operation with energized fluids reduces the potential for well damage and helps to transport fluids and cuttings to surface. When nitrogen and water are jetted as a two-phase fluid, the jet expands as it leaves the nozzle, reducing the jet impact pressure. Two-phase flow in the jet nozzle may also be sonically choked—limiting the jet discharge velocity and effectiveness. Moreover, fluid jets dissipate rapidly in the surrounding wellbore fluid. All these factors combine to reduce the effectiveness of a two-phase jet.

Removal of the gas from the fluid stream would enhance the performance of jetting for well servicing. A single phase water jet has higher density and stagnation pressure than a mixed-phase jet and would be more effective than a two-phase jet. Under conditions found in oil and gas well service operations, the gas cut in the fluid discharge from the separator should be less than 1 vol % to ensure effective jetting.

Shrouding the jets with the separated gas would reduce jet dissipation and increase the effective range of the jet. Many well service operations required that the jetting tools pass through small diameter tubing and obstructions before cleaning larger diameter tubing, downhole equipment in side-pocket mandrels or openhole wellbores; increased jetting range will increase the effectiveness of jetting tools compared to single-phase fluid jetting for these applications.

The use of energized fluid with a gas separator will also boost the differential pressure and hydraulic power of the jet by reducing bottomhole circulating pressure. Increased pressure and power will allow erosion of harder material such as mineral scale, cement and rock, while increased power will improve erosion rates.

An effective gas separator would maintain high efficiency over a relatively high range of inlet gas fractions. In a common application, sufficient nitrogen is added to reduce the bottomhole pressure to 50% of hydrostatic. Under these conditions compressed gas makes up 20 to 60% of the volume fraction of the flow inside the coil. The volume fraction of gas entering the separator may vary substantially during a single run due to changes in pressure and temperature as the operating depth of the tool increases.

The Latos et al patent (supra) describes a downhole phase separator for coiled tubing using a cyclonic separator design. This tool provides less than 5% gas cut for a supply fluid with 30% to 40% gas content. Cyclonic separators are used to swirl fluid flow through a set of vanes. This approach generates very high radial accelerations, which provide the separation forces. In small diameter tools, the high flow rate generates high turbulent mixing forces that overcome the separation forces and limit separation performance.

Rotary gas separators are commonly used in two-phase production to prevent gas from entering electric submersible pumps. The rotary gas separator is powered by the pump shaft and spins at 3500 or 1750 rpm depending on the electric motor and power supply. The system includes an inducer to pressurize the two-phase flow entering the separator. The flow enters a shrouded vane section where the flow spins and the water or oil moves to the outside due to centrifugal forces. The shroud rotates with the vanes reducing turbulence in the separator. A crossover manifold at the top directs the fluid flow to the pump and the gas flow back into the well annulus. The claimed gas cut is less than 10% for a wide range of flow rates and gas/liquid flow ratios, Inline rotary gas separators are also used in pipelines to remove small volumes of condensate from the gas flow. This style of separator uses a stator to induce swirling flow inside of a drum which includes rotor vanes in the gas flow. The rotor provides power to spin the drum. This type of separator is designed to remove all fluid from the gas stream as opposed to providing a low gas cut in the fluid.

Yahiro et al in U.S. Pat. No. 4,047,580 disclose a method for shrouding a submerged jet by introducing compressed air through the outer annular ring of a concentric jet nozzle. The air shroud increased the range of the jet by a factor of four. The construction of annular gas nozzles is complex, particularly for high-pressure fluid jetting.

SUMMARY OF THE INVENTION

A need still exists for an inline separator for efficiently separating a gas from a liquid. An object of the present invention is to meet this need by providing a relatively simple, compact separator for removing gas from a gas/liquid mixture.

Another object of the invention is to provide an apparatus combining a separator for separating gas from liquid and a jetting tool for inline, downhole operations.

Accordingly, the invention relates to an apparatus for separating a gas from a liquid under pressure comprising:

a tubular housing having an inlet end and an outlet end;

a stator in said inlet end of the housing for causing swirling of gas-containing liquid introduced into said inlet end;

a drum rotatably mounted in said housing downstream of said stator in the direction of liquid flow between said inlet and outlet ends of the housing;

a rotor in an inlet end of said drum for causing the drum to rotate in the housing;

an end wall in a downstream end of said drum in the direction of fluid flow through the housing;

liquid outlet ports in the periphery of said end wall for discharging liquid from the drum;

a gas outlet port in the centre of said end wall for discharging gas from the drum;

a liquid outlet passage in said housing for receiving liquid from said liquid outlet port and discharging liquid from said housing;

a gas outlet passage in said housing for receiving gas from said gas outlet port and discharging gas from said housing;

a first flow restriction in said liquid outlet for restricting liquid flow during discharge from the apparatus; and a second flow restriction in said gas outlet for restricting gas flow during discharge from the apparatus.

In another embodiment, the invention relates to a method of jetting comprising the steps of passing a two-phase fluid stream through a jetting tool, removing gas from the two-phase fluid stream thereby producing a gas-rich phase and a liquid phase containing less than 1 vol % gas. In a further embodiment, the gas-rich phase and the liquid phase are discharged from the tool and the gas-rich phase shrouds the discharge of the liquid phase.

In yet another embodiment, the invention relates to a method of pumping a two phase fluid containing a gas and a liquid into a wellbore and separating the gas phase phase from the liquid phase whereby the resulting liquid phase contains less than 1 vol % gas.

DETAILED DESCRIPTION OF THE INVENTION

Figure 1:
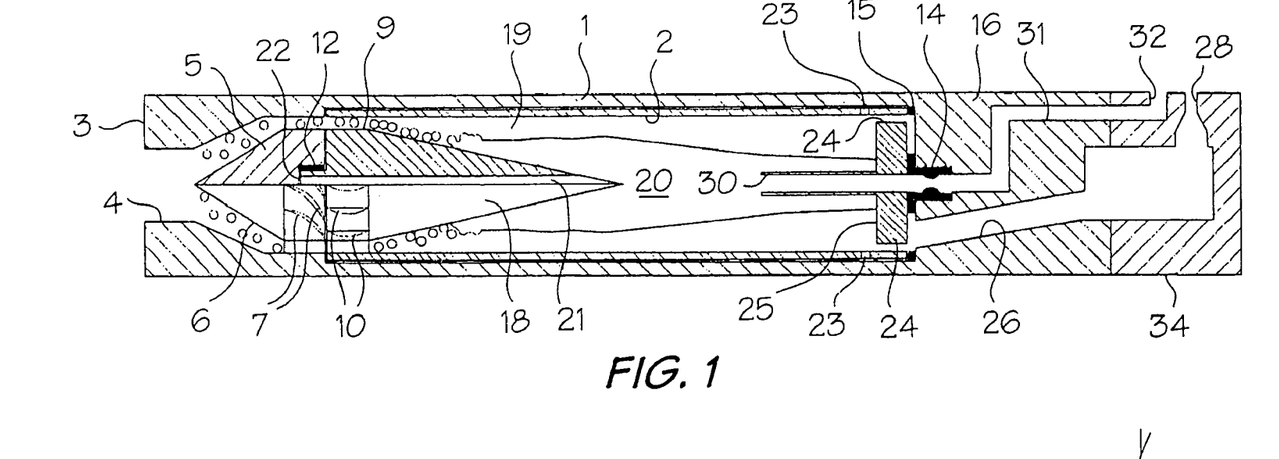
FIG. 1 is a schematic, longitudinal sectional view of a combination separator and jetting apparatus in accordance with the present invention.

Referring to FIG. 1, a separator in accordance with the invention includes an elongated tubular housing 1 containing a rotatable drum 2. A gas-containing liquid is introduced into the inlet end 3 of the housing 1 via a narrow diameter throat 4. The liquid passes around the conical end 5 of a stator 6, which is fixedly mounted in the housing. The stator 6 includes vanes 7 connected to the housing 1 for causing the fluid entering the housing 1 to swirl. The swirling flow causes a rotor 9 to spin. The rotor 9, which is connected to the drum 2, includes straight vanes 10 extending parallel to the longitudinal axis of the drum to ensure that the tangential flow of fluid in the drum 2 is small. The rotor 9 is rotatably supported in the stator 6 by a bearing 12. The flow of fluid through the rotor 9 causes rotation of both the rotor and the drum 2.

An end wall 25 of the drum 2 is rotatably connected to a discharge end of the housing 1 by a bearing 14 which has a restriction. The bearings 12 and 14 are formed of low friction materials and have a small diameter to limit bearing torque. The bearing 14 is a combined journal and thrust bearing, while the bearing 12 is a plain journal bearing. A clearance seal 15 is provided between the trailing end of the drum 2 and the trailing end 16 of the housing 1. Gas in the liquid entering the drum 1 via the stator 6 and the rotor 9 is separated from the mixture flowing past the conical trailing end 18 of the rotor 9 by centripetal acceleration, which forces the liquid 19 to the outside and the gas 20 to the center of the drum 2. Since the tangential component of fluid velocity is small, the total flow velocity is minimized which minimizes turbulent mixing forces opposing separation.

Preferably a balance pressure port 21 is provided in the rotor 9 for venting a balance pressure chamber 22 between the stator and the rotor. Reduced pressure in the chamber 22 reduces the thrust load imparted by the rotating drum 2 on the thrust bearing 12. Ports 23 can also be provided in the drum 2 near the trailing end thereof. The ports 23 are located in a region of low velocity liquid flow, which is at a higher pressure than the high velocity region between the stator 6 and the rotor 9. The ports 23 result in reverse circulation of fluid which counteracts the leakage of gas through the space between the housing 1 and the drum 2.

Liquid 19 is discharged from the drum 2 through ports 24 in the periphery of the end wall 25 of the drum 2. The ports 24 define sections of an annulus. The liquid flows through a passage 26 in the trailing end 16 of the housing 1 to a restriction in the form of a nozzle 28. The gas is discharged through a central, axially extending siphon tube 30 connected to the trailing end wall 25 of the drum 2, and a passage 31 and an orifice 32 in the trailing end 16 of the housing 1. Multiple gas outlets can be provided.

The gas orifice at the inlet end of the passage 31 is preferably sized as a sonic nozzle which will pass the maximum volumetric flow rate of gas anticipated in a given operation. The gas dynamics equations for sizing a gas orifice for a given pressure, temperature and flow rate are well known to those skilled in the art. The liquid nozzles 28 are sized to provide the maximum hydraulic jetting power taking into account frictional pressure losses in the coil. If the liquid flow rate increases and the gas fraction decreases, the differential pressure and flow rate across the liquid jet nozzles and gas orifice increases. Liquid entering the gas orifice causes it to choke, which reduces the gas flow capacity. The gas orifice therefore provides a simple and robust means of limiting liquid loss from the gas separator while maintaining pressure and hydraulic power of the liquid jets as the gas flow rates decrease.

The trailing end of the housing 1 in the direction of fluid flow is closed by a jetting assembly 34, which contains parts of the passages 26 and 31, the nozzle 28 and the orifices 32. The jetting assembly 34 is representative of a variety of more complex tools including rotary jetting tools, drilling motors and other tools relying on a restriction to fluid flow.

In a preferred embodiment of the invention, the gas orifice 32 is sized to be slightly larger than required for the maximum flow rate of gas anticipated in a given operation. The gas dynamics equations for sizing a gas orifice for a given pressure, temperature and flow rate are well known to those skilled in the art. The liquid nozzles 28 are sized for the pumped fluid flow rate at the desired jetting pressure, taking into account frictional pressure losses in the coil. If the gas fraction decreases, fluid will start to enter the siphon tube 30 and the orifice 32. The two-phase flow capacity of the gas orifice 32 is much smaller than the gas flow capacity. The gas orifice 32 therefore provides a simple and robust means of limiting liquid loss from the gas separator due to variations in inlet gas fraction that may occur during operation. Gas separator bench tests show that the liquid loss is 0.6% or smaller while the inlet gas fraction ranges from 29% to 52%.

Figure 2:
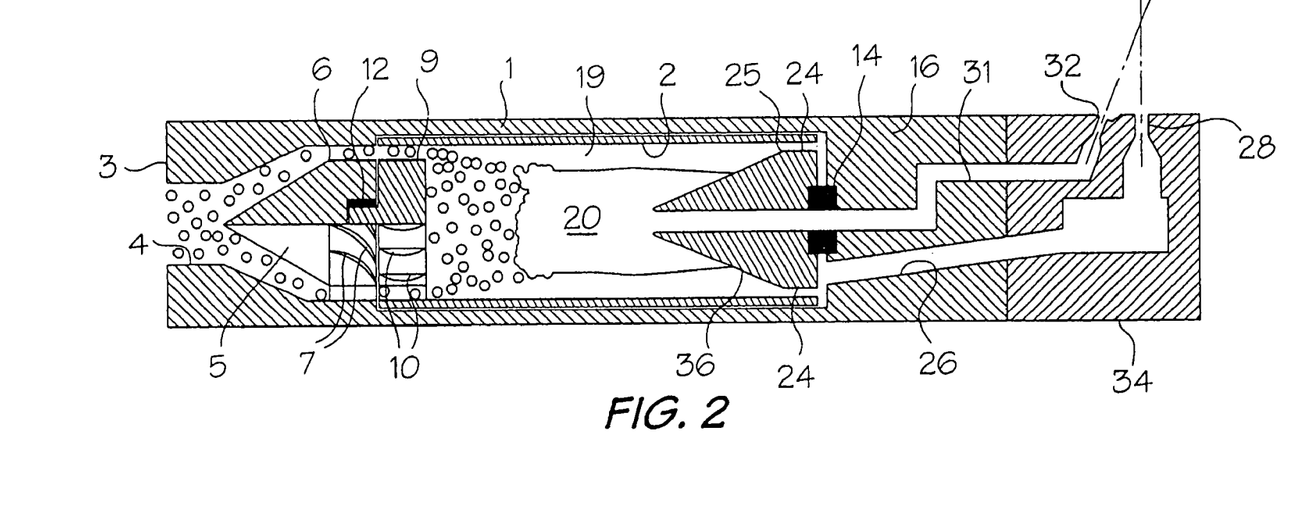
FIG. 2 is a schematic, longitudinal sectional view of a second embodiment of a combination separator and jetting tool in accordance with the present invention.

The embodiment of the invention shown in FIG. 2 is similar to that of FIG. 1 except that the rotor 9 is cylindrical with no conical trailing end, and the upstream end 36 of the drum end wall 25 is conical to accelerate the flow of liquid into the outlet ports 24 without introducing sudden changes in flow direction which could trigger turbulent remixing of gas and liquid. The axes of the nozzle 28 and the orifice 32 intersect outside of the jetting assembly 34 so that a gas shroud is formed around the liquid jet. The orifice 32 in the embodiment of FIG. 2 is restricted rather than bearing 14 as in the embodiment of FIG. 1.

Figure 3:
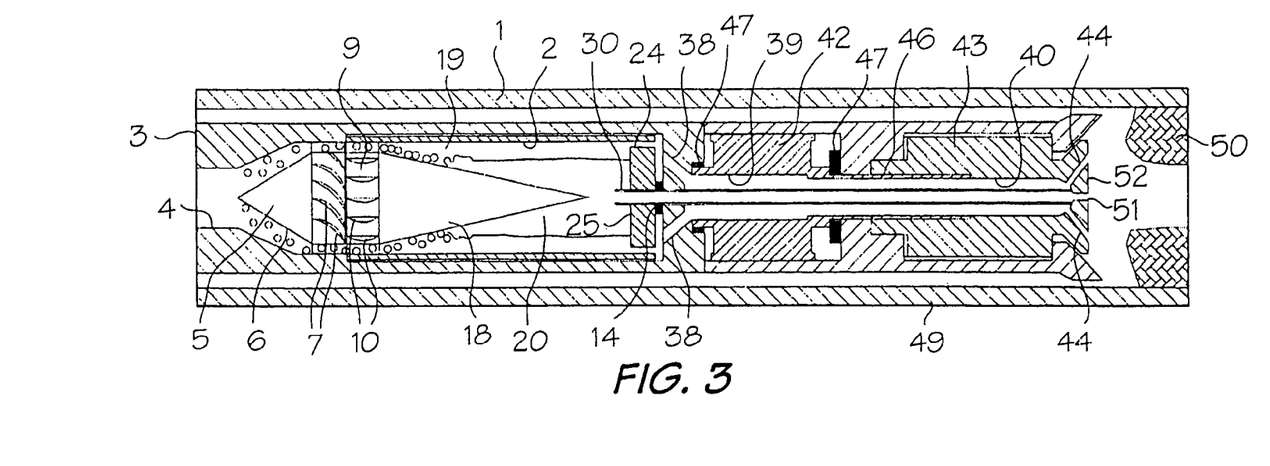
FIG. 3 is a schematic, longitudinal sectional view of a combination separator and rotary jetting tool in accordance with the invention.

FIG. 3 shows an apparatus for applications requiring rotary jetting of liquid leaving the apparatus. The apparatus of FIG. 3 is similar to that of FIG. 1 except that liquid discharged from the drum 2 via the siphon tube 30 passes through passages 38 in the trailing end of the housing 1, and central axial passages 39 and 40 via a brake assembly 42 and a head 43, respectively. The brake assembly 42, which includes a tube 46 carrying the head 43, is rotatably mounted on bearings 47 in the housing 1. The passage of liquid through the nozzles 44, which are offset from the longitudinal axis of the head 43, i.e. inclined with respect to radii of the head 43, causes the brake assembly 42 and the head 43 to spin in the housing. The nozzles 44 are located beyond the trailing end of the housing 1, so that when deployed in a oil or gas production tube 49, the fluid jets will remove scale deposits 50. It will be appreciated that any rotary motor with an axial flow passage sufficiently large to accommodate the siphon tube 30 can be used in combination with the separator. For example, the Marvin et al US Patent Application 2005/0109541 discloses a reaction turbine jet rotor with a large diameter, unobstructed axial flow passage.

The siphon tube 30 conveys gas from the drum 2 to a central outlet orifice 51 in the head 43. The inlet end of the siphon tube 30 is freely rotatable in the end wall 25 of the drum 2. The outlet end of the tube 30 is fixed in the rotatable head 43, which rotates at a different speed from the drum 2. Thus, a gas bubble forms at the outlet end of the head 51 and the outlet end of the housing 1, so that the liquid jets from the nozzles 44 into gas.

Figure 4:
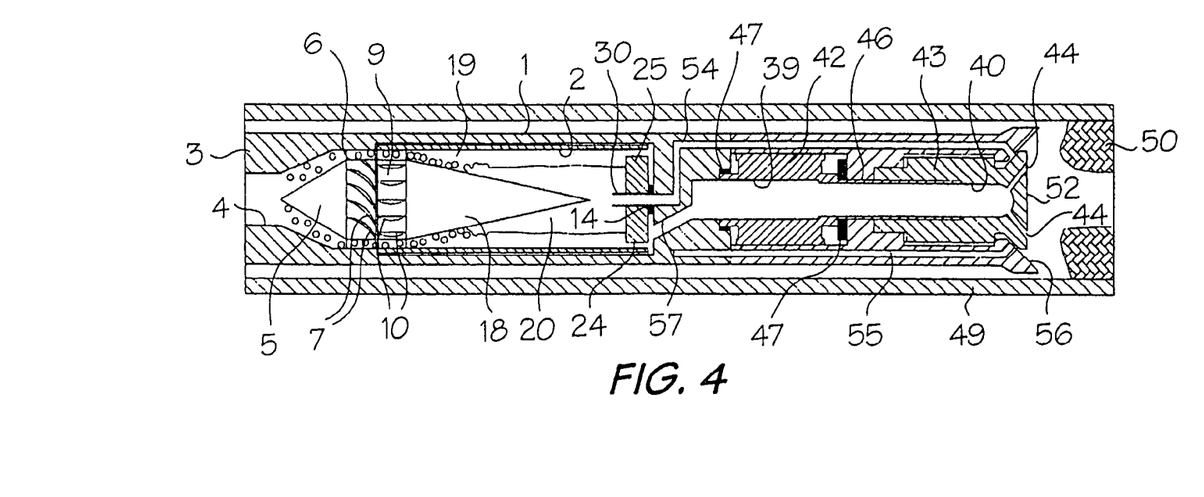
FIG. 4 is a schematic, longitudinal sectional view of a second embodiment of a combination separator and rotary jetting tool in accordance with the invention.

The apparatus of FIG. 4 is similar to that of FIG. 3 except that gas discharged through the siphon tube 30 passes through passage 54 and is discharged via a cylindrical passage 55 between the housing 1 and the discharge end 56 of the head 43. The liquid discharged through the ports 24 in the end wall 25 of the drum 2 passes through a passage 57 in the trailing end of the housing 1 into the passages 39 and 40, and through the brake assembly 42 and the head 42 to exit through the nozzle 44.

Figure 5:
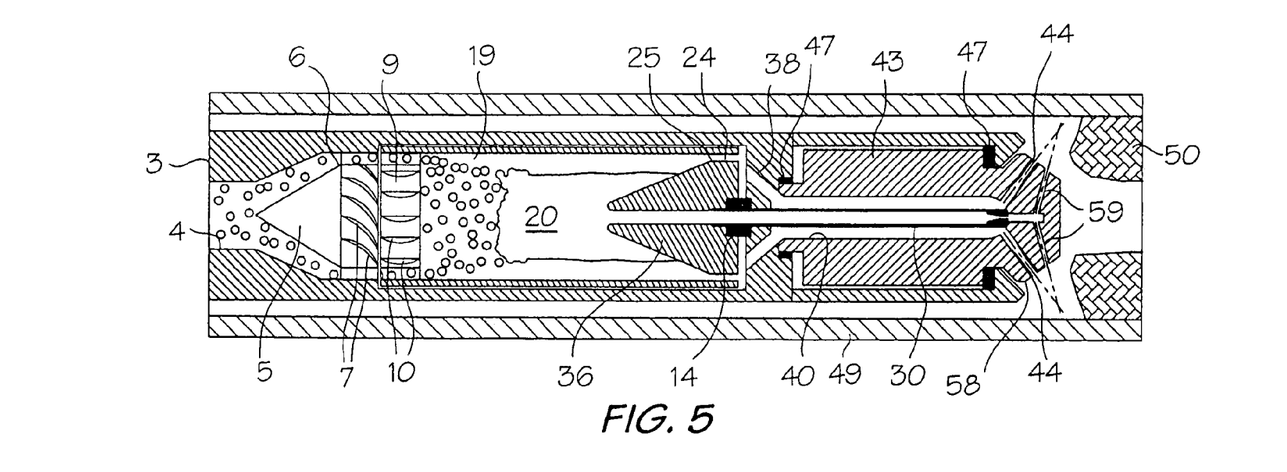
FIG. 5 is a schematic, longitudinal sectional view of a third embodiment of a combination separator and rotary jetting tool in accordance with the invention.

Referring to FIG. 5, another embodiment of the rotary jetting apparatus includes all of the elements of the apparatus of FIG. 3, except that the conical trailing end 18 of the rotor 9 and the brake assembly 42 have been omitted, and the cylindrical end wall 25 of the drum has been replaced with an end wall having a conical inlet or upstream end 36.

Moreover, in the apparatus of FIG. 5, the head 43 itself is rotatably mounted in the trailing end of the housing 1. Liquid is discharged through passages 38 and 40, and a plurality of inclined nozzles 44 in the trailing end of the head 43. The gas is discharged through the end wall 25 of the drum 2 via the siphon tube 30, a passage 58 in the trailing end of the head 43 and inclined nozzles 59. The trailing end of the siphon tube 30 includes a restriction 60. The axes of the nozzles 44 and 59 intersect outside of the head 43 so that the liquid jets are shrouded in gas.

Figure 6:
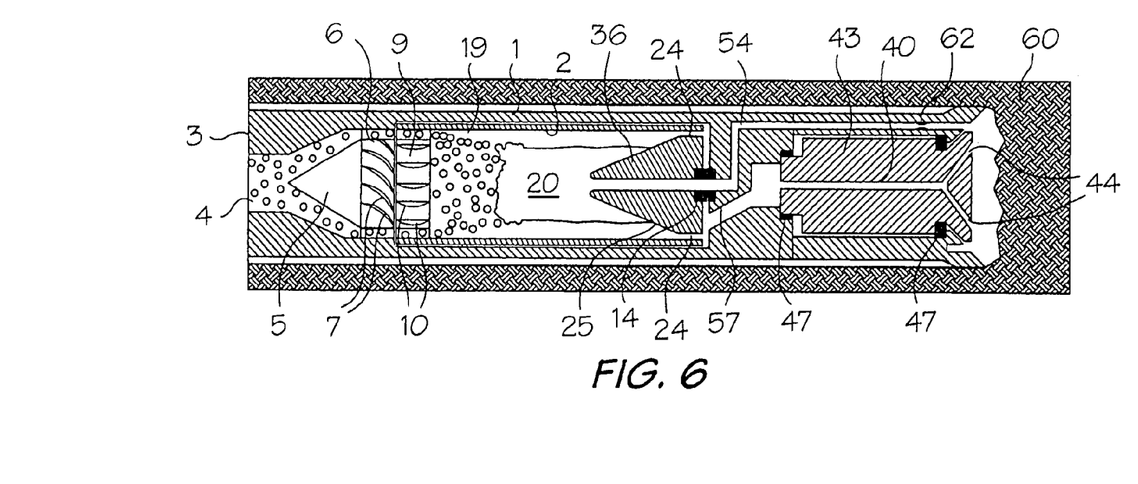
FIG. 6 is a schematic, longitudinal sectional view of a fourth embodiment of the combination separator and rotary jetting tool in accordance with the present invention.

The apparatus of FIG. 6 is used for cutting through a formation 60. The apparatus is similar to that of FIG. 4, except that the rotor 9 is cylindrical with no conical trailing end, the trailing end wall 25 of the drum 2 has a conical leading end 36, and the brake assembly 42 is omitted. Liquid is discharged via ports 24 in the drum end wall 25, a passage 57 in the trailing end of the housing 1, a central passage 40 in the head 43 and orifices 44. The gas passage 54 defining a siphon tube contains a restriction 62.

Figure 7:
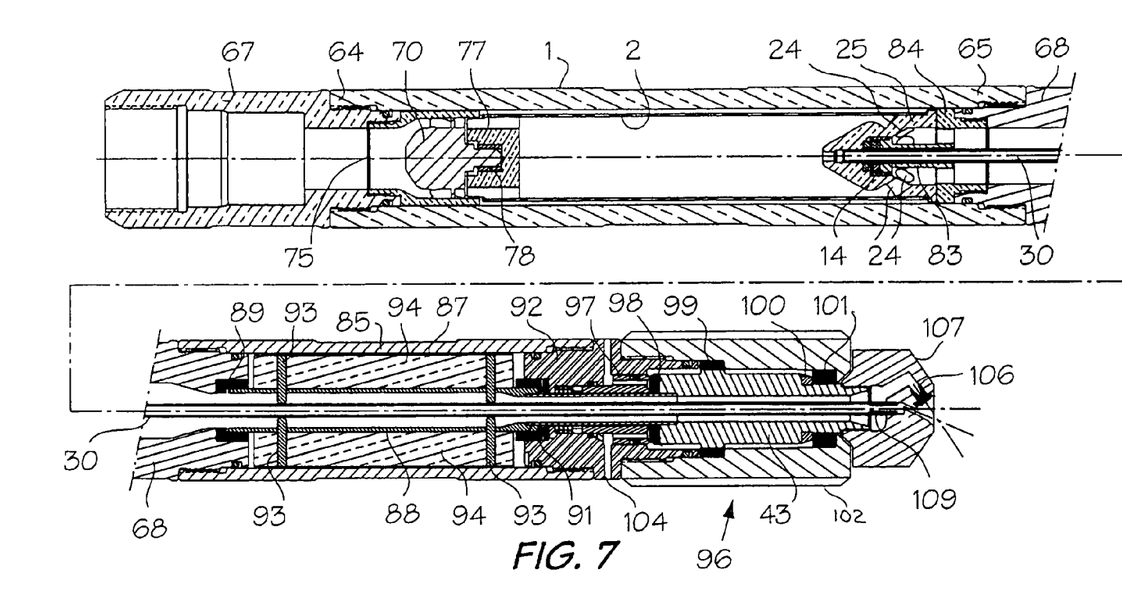
FIG. 7 is a schematic, longitudinal sectional view of a fifth embodiment of a combination separator and rotary cutting tool in accordance with the invention.
Figure 8:
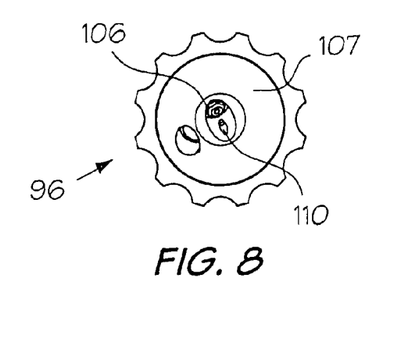
FIG. 8 is an end view of the separator and cutting tool of FIG. 7.
Figure 9:
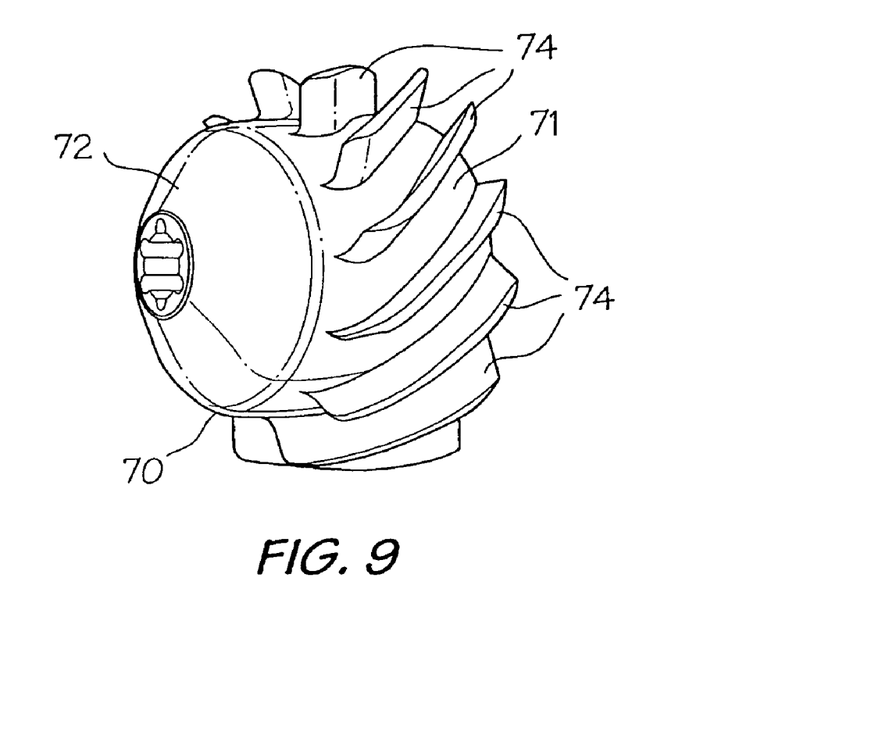
FIG. 9 is an isometric view of a stator used in the tool of FIG. 7.

With reference to FIG. 7, another embodiment of the combination separator jetting apparatus includes a separator including the housing 1 with internally threaded inlet and outlet ends 64 and 65, respectively for receiving couplings 67 and 68. A stator 70 is fixedly mounted in the inlet end 64 of the housing 1. As best shown in FIG. 9, the stator 70 includes a cylindrical body 71 with a generally hemispherical leading end 72. Arcuate vanes 74 extending outwardly from the body 71 connect the stator to a sleeve 75, which connects the stator to the housing 1.

Figure 10:
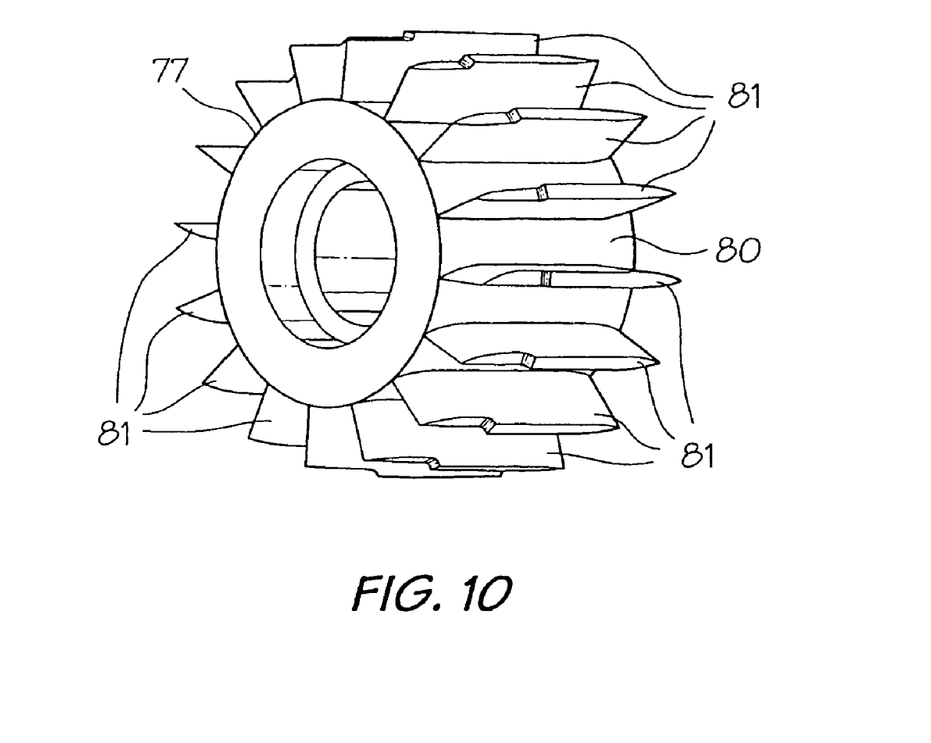
FIG. 10 is an isometric view of a rotor used in the tool of FIG. 7.

A cylindrical rotor 77 is rotatably mounted on a bearing 78 on the trailing end of the stator. The rotor 77 (FIG. 10) includes a cylindrical body 80 with radially extending vanes 81.

The end wall 25 of the drum 2 is rotatably mounted on a bearing 14 at the inlet end of a sleeve 83 on the siphon tube 30. The bearing 14 is connected to the inlet end of the coupling 68 by a sleeve 84. The downstream end of the coupling 68 is connected to a second housing 85 containing a speed governor 87. The speed governor 87 includes a central, tubular shaft 88, which is rotatably mounted on bearings 89 in the coupler 68 and bearings 91 in a coupler 92. Centralizers 93 in the shaft 88 center the siphon tube 30 in the speed governor. Segmented weights 94 around the shaft 88 govern the speed of rotation of the shaft by sliding outwardly against the housing 85.

A jetting assembly indicated generally at 96 is rotatably supported on the end of the coupling 92 by bearings 97, 98, 99, 100 and 101. The assembly 96 includes a housing 102 carrying a rotatable head 43. The bearing 97 includes a midface vent 104, which vents to the rotatable head 43 and forms a mechanical face seal with the bearing 98. The bearing 100 is fixed to the rotatable head 43. The bearing 100 forms a mechanical face seal with the bearing 101. The diameters of the bearing contact surfaces are sized to minimize the mechanical contact load on the mechanical face seals while maintaining effective sealing under high pressures.

Liquid discharged from the drum 2 through the ports 24 in the end wall 25 flows through three jet nozzles 106 (one shown) in a cap 107 on the rotating head 43. Gas discharged from the drum 2 travels through the siphon tube 30 and is discharged through a gas orifice 109 in the end of the siphon tube 30 and through three discharge ports 110 (one shown) in the cap 107 to form shrouds around the liquid jets.

What is claimed:

1. An apparatus for separating a gas from a liquid under pressure comprising:
   a tubular housing having an inlet end and an outlet end;
   a stator in said inlet end of the housing for causing swirling of gas-containing liquid introduced into said inlet end;
   a drum rotatably mounted in said housing downstream of said stator in the direction of liquid flow between said inlet and outlet ends of the housing;
   a rotor in an inlet end of said drum for causing the drum to rotate in the housing;
   an end wall in a downstream end of said drum in the direction of fluid flow through the housing;
   liquid outlet ports in the periphery of said end wall for discharging liquid from the drum;
   a gas outlet port in the center of said end wall for discharging gas from the drum;

a liquid outlet passage in said housing for receiving liquid from said liquid outlet ports and discharging liquid from said housing;

a gas outlet passage in said housing for receiving gas from said gas outlet port and discharging gas from said housing;

a first flow restriction in said liquid outlet passage for restricting liquid flow during discharge from the apparatus; and a second flow restriction in said gas outlet passage for restricting gas flow during discharge from the apparatus.

2. The apparatus of claim 1, wherein said rotor includes vanes extending longitudinally of the housing and drum for directing the gas-containing liquid longitudinally of said drum.

3. The apparatus of claim 1, including a jetting assembly on said housing downstream of said outlet end of the housing, said assembly containing said first flow restriction.

4. The apparatus of claim 3, wherein said first flow restriction is a nozzle in said jetting assembly for discharging a liquid jet from the apparatus.

5. The apparatus of claim 4, wherein said second flow restriction is a restricted orifice in said jetting assembly for discharging gas from the apparatus.

6. The apparatus of claim 5, wherein said nozzle and said restricted orifice have longitudinal axes intersecting outside of said jetting assembly, whereby a gas shroud is formed around said liquid jet.

7. The apparatus of claim 1, further comprising:
a jetting head rotatable in said housing downstream of said end wall for receiving liquid and gas;

a central passage in said head for receiving liquid from said liquid outlet ports;

inclined liquid orifices in said head for jetting liquid from said head, whereby the head is caused to rotate in the housing;

a siphon tube defining said gas outlet passage extending through said central passage;

a restriction in said siphon tube proximate a discharge end thereof; and inclined gas discharge nozzles in said head for discharging gas from said head to intersect said liquid jetting from said liquid orifices.

8. The apparatus of claim 7, wherein said liquid and gas orifices have longitudinal axes intersecting outside of said housing, whereby a gas shroud can form around liquid jetting from said liquid orifices.

9. The apparatus of claim 8, including a speed governor rotatable in said housing between said end wall and said head, said speed governor supporting said head in the housing and governing the speed of rotation of the head.

10. The apparatus of claim 1, wherein said end wall of the drum includes a conical end extending upstream with respect to the direction of travel of liquid and gas in said housing for ensuring the smooth flow of liquid to said liquid outlet ports.

* * * * *

UNITED STATES PATENT AND TRADEMARK OFFICE
CERTIFICATE OF CORRECTION

PATENT NO. : 7,677,308 B2 Page 1 of 1
APPLICATION NO. : 11/384455
DATED : March 16, 2010
INVENTOR(S) : Jack J. Kolle It is certified that error appears in the above-identified patent and that said Letters Patent is hereby corrected as shown below:

On the Title page under "(73) Assignees": Insert -- Tempress Technologies, Inc.; Trican Well Service Ltd. --

Signed and Sealed this

Thirteenth Day of July, 2010

David J. Kappos
*Director of the United States Patent and Trademark Office*